Feb. 23, 1960    W. E. FOLKERTS    2,925,744
BALL BEARING RECIRCULATING DEVICE
Filed Jan. 29, 1959    2 Sheets-Sheet 2
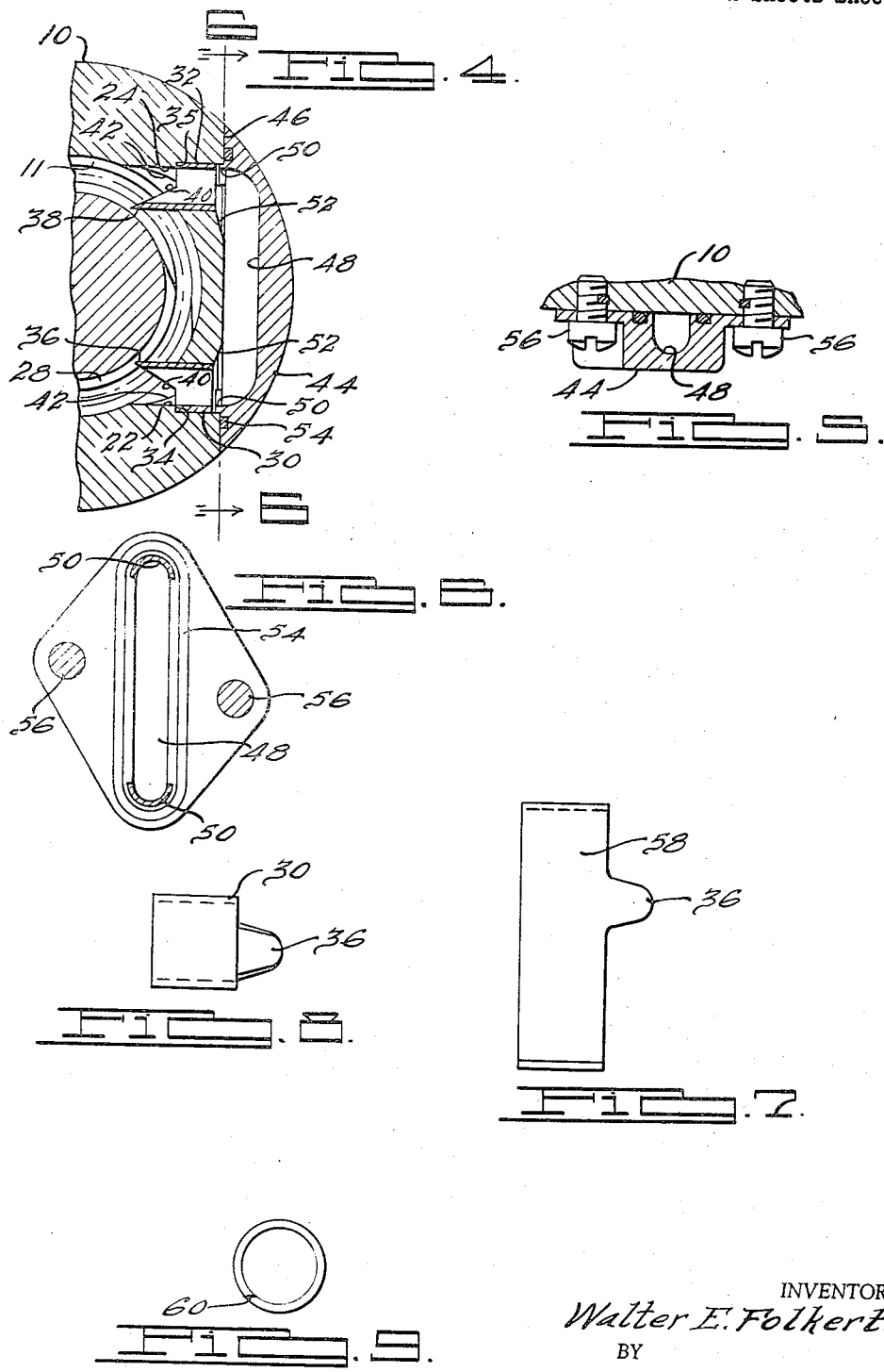
INVENTOR.
Walter E. Folkerts
BY
Harness and Harris
ATTORNEYS

United States Patent Office 2,925,744
Patented Feb. 23, 1960

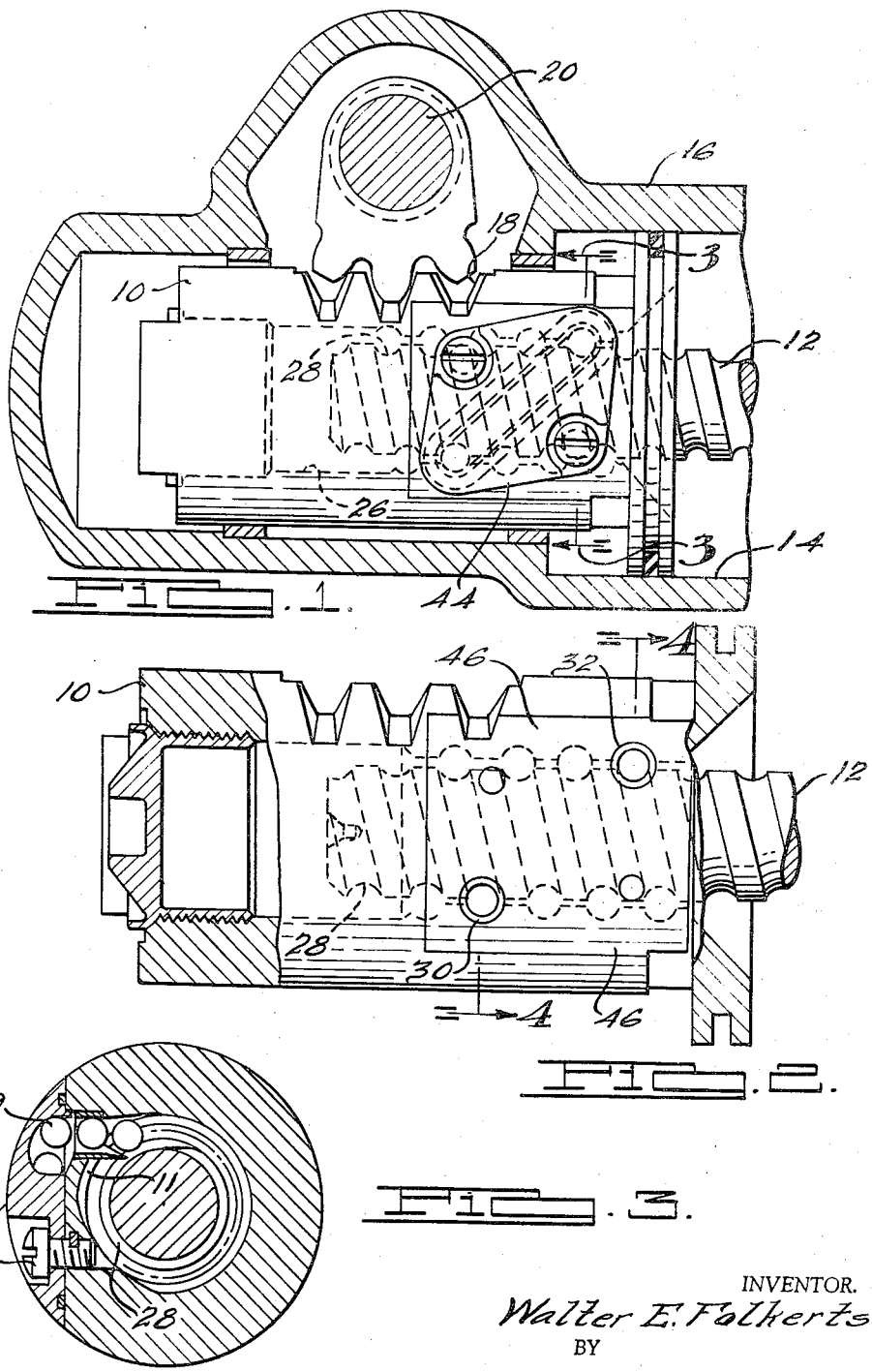

2,925,744

BALL BEARING RECIRCULATING DEVICE

Walter E. Folkerts, Hazel Park, Mich., assignor to Chrysler Corporation, Highland Park, Mich., a corporation of Delaware Application January 29, 1959, Serial No. 789,930

5 Claims. (Cl. 74—459)

This invention relates to a ball bearing type of screw threaded nut and bolt assembly and in particular relates to a novel ball bearing recirculating means for removing the ball bearings from the threaded worm of a power steering unit and transferring them exteriorly of the bore of the power steering piston back to the worm thread over a distance normally greater than the pitch of the worm thread.

In power steering worm and piston assemblies of the above mentioned ball bearing type, the problem exists of providing some means to allow a recirculation of the ball bearings as the worm is moved relative to the piston. This recirculation of the balls is necessary to maintain a continuous, freely moving bearing surface for the worm as it moves in the piston. Heretofore various types of ball recirculating means have been provided but have not proven entirely satisfactory in that certain of these devices have allowed or caused the ball bearings to stick or move against excessive friction around the worm threads. For correct operation of the worm and cooperating piston, it is necessary that the balls move in a free rolling manner throughout their recirculating path with a minimum of frictional interference from the recirculating means.

The present invention provides a relatively inexpensive recirculating means which is extremely effective in causing the ball bearings to recirculate from one portion of the worm thread to another portion thereof to provide the aforesaid continuous ball bearing surface for the worm.

This is accomplished in the present invention by providing shuttle tubes loosely nested in the wall of the power steering piston so that the shuttles may be freely slidable and rotatable within limits therein. Portions of the tubes extend into the bore of the piston and into the groove of the worm thread. The shuttles are limited in their insertion into the worm groove so that they do not touch the bottom of the worm groove but are sufficiently inserted therein to guide the ball bearings out of the groove over the recirculating path and back into the groove at a point distant from the point of removal.

These loosely nested shuttles are able, through their freedom of movement, to accommodate manufacturing dimension variations of the piston and worm threads and the ball bearings and provide thereby recirculating means capable of eliminating frictional resistance against movement within the recirculating means of the ball bearings due to these dimensional variations.

It is a principal object of this invention to provide a ball bearing recirculating means for a power steering mechanism which means is relatively inexpensive to construct and which is adaptable for use in mass production power steering units regardless of the normal manufacturing dimension variations inherent in such mass production of power steering units.

A specific object of this invention is to provide a power steering piston with movable ball bearing shuttle means for removing the ball bearings from the worm thread and transporting them to another portion of the worm thread removed from the point of removal.

Further objects and advantages will become apparent from the following description and drawings, in which:

Figure 1 represents a cross sectional view of a power steering piston and worm assembly mounted in a power steering housing;

Figure 2 represents the power steering piston and worm assembly of Figure 1 without the housing and cross over cap;

Figure 3 represents a cross-sectional view of the assembly of Figure 1 taken along the line corresponding to 3—3 in the direction of the arrows;

Figure 4 represents a cross sectional view taken along the line 4—4 of Figure 2 in the direction of the arrows;

Figure 5 represents a cross sectional view of the ball bearing recirculating tunnel of Figure 2 taken along the line B—B thereof in the direction of the arrows;

Figure 6 is a view of the ball bearing recirculating tunnel taken along the line 6—6 of Figure 4 in the direction of the arrows;

Figure 7 represents a plan view of a shuttle blank;

Figure 8 represents a side view of a finished shuttle; and

Figure 9 represents an end view of the shuttle of Figure 8.

Referring to the drawings and in particular to Figure 1, a power steering piston and worm assembly comprising a worm 12 having a thread groove 28 and a piston 10 having a complementary thread groove 11 is slidably mounted in cylinder 14 of power steering housing 16. Piston 10 is readily engaged at 18 with shaft 20 which is operatively connected to the front wheels of an automotive vehicle and responsive to movement of piston 10 to exert a steering force on said wheels.

Referring to Figure 2, apertures 22 and 24 are provided in piston 10 and extend into the bore 26 of piston 10 to communicate therein with the thread groove 28 of the worm 12. Apertures 22 and 24 are parallel as shown in Figure 4 and the inner edge of each is substantially tangential to the thread groove 28 in worm 12. Shuttles 30 and 32 are freely slidably mounted in apertures 22 and 24 and are limited in their insertion therein by shoulders 34 and 35 respectively, as shown in Figure 4. Shuttles 30 and 32 are provided with ball bearing engaging projections 36 and 38 respectively. These projections extend into the groove 28 of worm 12 to a position adjacent the bottom of groove 28. Shuttles 30 and 32 are rotatable in their apertures until the edge portions 40 thereof abut the vertical portion 42 of shoulders 34 and 35. Projections 36 and 38 on members 30 and 32 respectively are tapered to a spoon shape as shown in Figures 3, 4 and 8 to more easily remove the ball bearings 39 from the worm thread groove 28.

Referring to Figure 4, a ball bearing crossover cap 44 is positioned on the machine flat surface 46 of the piston 10 and is provided with a groove 48 providing a crossover tunnel for the ball bearings 39. As shown in Figure 6, a semi-circular lip 50 at each end of the tunnel 48 projects a short distance into each of the apertures 22 and 24 to limit the upward movement of shuttles 32 and 30. A countersink or bevel 52 is provided on the flat surface 46 of the piston adjacent to the apertures 22 and 24 to allow the ball bearings to more freely slide into and out of these apertures. An O-ring seal 54 provides a dirt and hydraulic fluid seal for the crossover cap. Bolts 56 on either side of the cap 44 provide securing means for the cap.

The shuttles may be made from a stamped or otherwise formed blank 58 of metal or formable plastic material, which blank is then bent into a cylinder or tubular shape as shown in Figure 9, and joined at 60 by suitable brazing, welding, or plastic welding process.

It is a major feature of this invention that the shuttles 30 and 32 are able to freely adapt themselves to the dimensions of the piston and worm threads and the ball bearings movable therein. This adaptability of the shuttles make it unnecessary to maintain the very close manufacturing tolerances hereto necessary in the production of power steering units, and it naturally follows that the number of rejects and production cost is thereby greatly reduced.

I claim:

1. A ball bearing screw threaded stud and nut assembly comprising a stud having a helical screw thread in the outer surface thereof, a nut having a bore for receiving said stud, a helical screw thread in the surface of said bore, said threads in said stud and bore being of a complementary shape and direction, an aperture in said nut on either side of the longitudinal axis of said bore and communicating therewith, said apertures being longitudinally spaced apart, a tubular shaped ball bearing shuttle slidably and rotatably nested in each of said apertures, and a ball bearing engaging portion on each of said shuttles extending into the thread of said stud to a position adjacent the bottom thereof, said shuttles being adapted to guide the ball bearings into and out of the thread of said stud.

2. A ball bearing screw threaded stud and nut assembly comprising a stud having a helical screw thread in the outer surface thereof, a nut having a bore receiving said stud, a helical screw thread in the surface of said bore, said threads in said stud and bore being of a complementary shape and direction, a plurality of ball bearings in said threads, an aperture in said nut on either side of the longitudinal axis of said bore and communicating therewith, said apertures being longitudinally spaced apart at least the pitch distance of said helical threads, a tubular shaped ball bearing shuttle slidably and rotatably nested in each of said apertures, shoulder means on said nut for abutting an inner portion of each of said shuttles to limit their insertion into their respective apertures, and a ball bearing engaging projection on each of said shuttles extending into the thread of said stud to a position adjacent the bottom thereof, said shuttles being adapted to guide the ball bearings into and out of the thread of said stud.

3. A ball bearing screw threaded stud and nut assembly comprising a stud having a helical screw thread in the outer surface thereof, a nut having a bore for receiving said stud, a helical screw thread in the surface of said bore, said threads in said stud and bore being of a complementary shape and direction, an aperture in said nut on either side of the longitudinal axis of said bore and communicating therewith, said apertures being longitudinally spaced apart at least the pitch distance of said helical threads, a tubular shaped ball bearing shuttle loosely nested in each of said apertures, and a ball bearing engaging projection on each of said shuttles extending into the thread of said stud to a position spaced from the bottom thereof, a plurality of ball bearings in the portion of said threads lying intermediate said shuttles, said shuttles being adapted to guide the ball bearings into and out of the thread of said stud, and means on said nut forming a pathway between said shuttles exteriorly of said bore for transferring said ball bearings from one shuttle to the other.

4. In a power steering unit, a piston having a longitudinally extending bore and a helical thread groove in the wall of said bore, a steering worm in said bore, said worm having a thread groove of a complementary shape to the groove in said bore, a plurality of ball bearings in said thread grooves for movably supporting said piston on said worm, a pair of longitudinally spaced parallel apertures extending through the wall of said piston on opposite sides of the longitudinal axis thereof and communicating with the thread groove in the bore thereof, a tubular member slidably and rotatably mounted in each of said apertures, shoulder means in said piston for abutting the inner end of each of said tubular members to limit their insertion into their respective apertures, said tubular members each having an inner portion positioned adjacent to the bottom of the thread groove in said worm for guiding the ball bearings into and out of the same, and means communicating with the outer ends of said tubular members and forming a ball bearing passageway therebetween for guiding said ball bearings from each of said tubular members to the other.

5. A ball bearing recirculating device for use with a power steering worm and piston unit wherein the worm is threadably mounted on ball bearings which roll in complementary thread grooves in the worm and piston, said recirculating device comprising a pair of ball bearing shuttle tubes adapted to be movably mounted in a pair of apertures in the wall of said piston, a ball engaging projection extending from one end of each of said tubes and adapted to extend into the thread groove in said worm, a crossover cap having ball passage means therein for connecting said tubes to allow movement of the ball bearings therebetween, and shoulder means carried by said cap to limit movement of said tubes in said piston wall.

References Cited in the file of this patent

UNITED STATES PATENTS

| | | |
|---|---|---|
| 2,828,721 | Folkerts | Apr. 1, 1958 |
| 2,833,157 | Gates | May 6, 1958 |
| 2,851,897 | Cochrane | Sept. 16, 1958 |